United States Patent
Hammerstrom

(10) Patent No.: US 11,676,222 B2
(45) Date of Patent: Jun. 13, 2023

(54) CONTROLLING THE STATUS OF FREQUENCY-MANAGED ELECTRIC DEVICES

(71) Applicant: Battelle Memorial Institute, Richland, WA (US)

(72) Inventor: Donald J. Hammerstrom, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 219 days.

(21) Appl. No.: 16/863,272

(22) Filed: Apr. 30, 2020

(65) Prior Publication Data

US 2020/0349657 A1 Nov. 5, 2020

Related U.S. Application Data

(60) Provisional application No. 62/841,656, filed on May 1, 2019.

(51) Int. Cl.
*G06Q 50/06* (2012.01)
*G06Q 30/02* (2023.01)
*H02J 3/14* (2006.01)
*G06Q 30/0201* (2023.01)

(52) U.S. Cl.
CPC ......... *G06Q 50/06* (2013.01); *G06Q 30/0206* (2013.01); *H02J 3/14* (2013.01)

(58) Field of Classification Search
None
See application file for complete search history.

(56) References Cited

U.S. PATENT DOCUMENTS

| | | | |
|---|---|---|---|
| 6,392,371 B1* | 5/2002 | Cheng | H02P 9/48 |
| | | | 318/158 |
| 7,010,363 B2 | 3/2006 | Donnelly et al. | |
| 7,149,605 B2 | 12/2006 | Chassin et al. | |
| 7,420,293 B2 | 9/2008 | Donnelly et al. | |

(Continued)

FOREIGN PATENT DOCUMENTS

| | | | | |
|---|---|---|---|---|
| CN | 105186511 A | * | 12/2015 | ............... H02J 3/24 |
| CN | 107181266 A | * | 9/2017 | ............... H02J 3/24 |

OTHER PUBLICATIONS

Li et al., "Frequency control in micro-grid power system combined with electrolyzer system and fuzzy PI controller", Janurary 2008, Journal of Power Sources 180 (2008) 468-475. (Year: 2008).*

(Continued)

*Primary Examiner* — Mohammad Ali
*Assistant Examiner* — Kelvin Booker
(74) *Attorney, Agent, or Firm* — Klarquist Sparkman, LLP

(57) ABSTRACT

Apparatus comprise control circuitry configured to control a line frequency of a microgrid by directing a first set of one or more electrical devices coupled to the microgrid to produce a change in the line frequency through a change in operation of the first set, such that a second set of one or more electrical devices coupled to the microgrid adjusts operation in response to a detected line frequency changeably produced by the first set. Related methods and additional apparatus and methods are disclosed. Apparatus and methods are disclosed that use line frequency and/or line voltage. Apparatus and methods are also disclosed that use control history.

31 Claims, 10 Drawing Sheets

(56) References Cited

U.S. PATENT DOCUMENTS

| | | | |
|---|---|---|---|
| 8,073,573 B2 | 12/2011 | Chassin et al. | |
| 8,478,452 B2* | 7/2013 | Pratt | B60L 53/51 |
| | | | 700/297 |
| 8,482,290 B2* | 7/2013 | Steckley | H02J 3/14 |
| | | | 324/520 |
| 8,639,392 B2 | 1/2014 | Chassin | |
| 9,252,601 B2* | 2/2016 | Bo | H02J 3/381 |
| 9,310,762 B2 | 4/2016 | Lu et al. | |
| 9,425,620 B2 | 8/2016 | Chassin et al. | |
| 9,601,925 B2* | 3/2017 | Stinessen | E21B 33/0355 |
| 9,742,189 B2* | 8/2017 | Watanabe | H02J 3/46 |
| 9,762,060 B2 | 9/2017 | Kalsi et al. | |
| 11,146,103 B1* | 10/2021 | Davies | H02J 3/383 |
| 2008/0303348 A1* | 12/2008 | Witters | H02J 3/382 |
| | | | 307/72 |
| 2010/0218027 A1* | 8/2010 | Boss | G06Q 50/06 |
| | | | 713/340 |
| 2010/0219808 A1* | 9/2010 | Steckley | G01R 19/2513 |
| | | | 324/76.77 |
| 2011/0043160 A1* | 2/2011 | Serban | G05F 1/67 |
| | | | 320/101 |
| 2011/0147360 A1* | 6/2011 | Hammerstrom | H02J 3/383 |
| | | | 219/209 |
| 2011/0245987 A1* | 10/2011 | Pratt | G05B 15/02 |
| | | | 320/132 |
| 2012/0019074 A1* | 1/2012 | Frolov | H02J 3/383 |
| | | | 307/43 |
| 2012/0083930 A1* | 4/2012 | Ilic | G06Q 30/06 |
| | | | 703/2 |
| 2013/0099565 A1* | 4/2013 | Sachs | H02J 3/381 |
| | | | 307/25 |
| 2014/0088780 A1* | 3/2014 | Chen | H02J 3/14 |
| | | | 700/295 |
| 2014/0091622 A1* | 4/2014 | Lucas | H02J 3/381 |
| | | | 318/400.04 |
| 2014/0172503 A1 | 6/2014 | Hammerstrom et al. | |
| 2014/0188689 A1* | 7/2014 | Kalsi | G05F 5/00 |
| | | | 705/37 |
| 2014/0246925 A1* | 9/2014 | Porter | H02J 3/14 |
| | | | 307/115 |
| 2014/0252855 A1* | 9/2014 | Watanabe | H02J 3/383 |
| | | | 307/31 |
| 2014/0319911 A1* | 10/2014 | Alexander | H02J 9/062 |
| | | | 307/22 |
| 2014/0358308 A1* | 12/2014 | Steckley | H02J 13/00 |
| | | | 700/292 |
| 2015/0295402 A1* | 10/2015 | Black | H02J 13/00022 |
| | | | 700/291 |
| 2015/0295405 A1* | 10/2015 | Black | H02J 9/062 |
| | | | 700/295 |
| 2015/0311716 A1* | 10/2015 | He | H02J 3/46 |
| | | | 700/287 |
| 2015/0318705 A1* | 11/2015 | Lucas | H02J 3/46 |
| | | | 307/129 |
| 2016/0006254 A1* | 1/2016 | Bundschuh | H02J 3/40 |
| | | | 307/45 |
| 2016/0010879 A1* | 1/2016 | Rognli | F24H 9/2021 |
| | | | 700/287 |
| 2016/0197477 A1* | 7/2016 | Majumder | H02J 3/38 |
| | | | 307/24 |
| 2016/0306372 A1* | 10/2016 | Holveck | G05F 1/625 |
| 2016/0313716 A1* | 10/2016 | Chen | H02J 13/00002 |
| 2017/0288561 A1* | 10/2017 | Lemberg | H02M 7/539 |
| 2018/0131183 A1* | 5/2018 | Kim | H02J 3/38 |
| 2018/0316184 A1* | 11/2018 | Hong | H02H 7/262 |
| 2019/0037515 A1* | 1/2019 | Shamir | H04J 3/0664 |
| 2019/0052083 A1* | 2/2019 | Lucas, Jr. | H02J 3/18 |
| 2020/0303943 A1* | 9/2020 | Jin | H02J 3/381 |

OTHER PUBLICATIONS

Short et al., "Stabilization of Grid Frequency Through Dynamic Demand Control", Jul. 2006, IEEE Transactions on Power Systems, vol. 22, No. 3, Aug. 2007. (Year: 2006).*

* cited by examiner

CONTROLLING THE STATUS OF FREQUENCY-MANAGED ELECTRIC DEVICES

CROSS REFERENCE TO RELATED APPLICATION

This application claims the benefit of U.S. Provisional Patent Application No. 62/841,656, filed May 1, 2019, which is incorporated by reference herein.

ACKNOWLEDGMENT OF GOVERNMENT SUPPORT

This invention was made with government support under Contract DE-AC0576RL01830 awarded by the U.S. Department of Energy. The government has certain rights in the invention.

FIELD

The disclosure generally relates to electrical distribution and more particularly to managing electronic devices in microgrid environments with frequency and/or voltage.

BACKGROUND

The cost for energy production has increased and as more and more consumers demand electricity, the cost and need for ways to manage supply and demand also are increasing. One of the tools that has been created for managing electricity is autonomous frequency control. An example of such a device is found in Pacific Northwest National Laboratory's Grid Friendly Appliance controller. While such controllers can provide a variety of advantages on large grids, such as by reducing or effectively providing spinning reserve and frequency regulation, the full extent of their benefits have not been realized and additional environments and situations remain where they can excel in use and offer various advantages.

SUMMARY

According to an aspect of the disclosed technology, apparatus include control circuitry configured to control a line frequency of a microgrid by directing a first set of one or more electrical devices coupled to the microgrid to produce a change in the line frequency through a change in operation of the first set, such that a second set of one or more electrical devices coupled to the microgrid adjusts operation in response to a detected line frequency changeably produced by the first set. Some examples include second set control circuitry configured to receive line frequency detection data indicating the detected line frequency, wherein the second set control circuitry is configured to control the adjusting of operation of the second set based on the detected line frequency. In some examples, the second set control circuitry and the control circuitry are part of a common controller configured to communicate with the first set and second set. In some examples, the second set control circuitry comprises local control circuitry arranged proximate to one or more of the electrical devices of the second set. In some examples, the second set control circuitry is configured to control the adjusting of operation of the second set in response to the detected line frequency passing a predetermined line frequency threshold. In some examples, the second set control circuitry is configured to change operation of the second set when the detected line frequency passes below the predetermined line frequency threshold. In some examples, the second set control circuitry is configured to change operation of the second set when the detected line frequency passes above the predetermined line frequency threshold. In some examples, the line frequency threshold is distributed between a pair of configurable lower and upper threshold frequency values and distributed among a plurality of the electrical devices of the second set such that the second set control circuitry is configured to change the operation of the plurality of the electrical devices of the second set proportionally to the detected line frequency between the lower and upper threshold frequency values. In some examples, the line frequency threshold is distributed randomly between the lower and upper threshold frequency values according to a flat probability distribution. In some examples, the line frequency threshold is distributed randomly between the lower and upper threshold frequency values according to a non-flat probability distribution. In some examples, the control circuitry and/or second set control circuitry are configured to periodically redistribute the line frequency thresholds among the plurality of the electrical devices of the second set between the pair of lower and upper threshold frequency values. In some examples, the second set control circuitry is configured to control the second set according to a duty cycle. Some duty cycles can vary based on the detected line frequency. In some examples, at least one of the electrical devices of the second set includes an electricity consuming device, wherein the second set control circuitry is configured to control an adjusting of an electricity consumption of the electricity consuming device in response to the detected line frequency. Some example electricity consuming devices are water heaters. In some examples at least one of the electrical devices of the second set includes an electricity generating device, with the second set control circuitry is configured to control an adjusting of an electricity generation of the electricity generating device in response to the detected line frequency. In some examples at least one of the electrical devices of the second set includes an electricity storage device, with the second set control circuitry is configured to control an adjusting of an electricity charging power from the microgrid and/or an electricity discharging power to the microgrid of the electricity storage device in response to the detected line frequency. Some examples electricity storage devices can include battery energy storage systems. In some examples, the control circuitry is configured to control the line frequency to follow a predetermined microgrid load profile. In some examples, the control circuitry is configured to control the line frequency to increase use of or to prioritize a selected electricity generation resource relative to another electricity generation source. Some selected electricity generation resource examples can include renewable electricity generation devices. In some examples, the control circuitry is configured to estimate an electricity usage of the second set based on a history of controlled line frequency and modeled characteristics of electrical devices of the second set. Some estimated energy usages can be used to estimate a present stored energy and present energy usage or generation of one or more energy storage systems of the second set. In some examples, the control circuitry is configured to control the line frequency based on electrical operational characteristics of the second set, line frequency control history that produced change in operation of the second set, and at least one criterion for controlling operation of the second set through change of line frequency. In some examples, the control circuitry is configured to change a relative sensitivity to the line frequency for one or more of the electrical devices of the second set. In some examples, the control circuitry is configured to assign different sensitivities based on one of a plurality of microgrid operational profiles, wherein the microgrid operational profiles include at least one of a normal profile, isolated profile, or critical profile. Some example control circuitry is further configured to select the line frequency command based on electricity demand and/or supply price signals. Some example control circuitry is further configured to select the line frequency command to prioritize usage of a renewable electricity generation device. In some examples, the control circuitry is further configured to regulate the line frequency to 50 Hz or 60 Hz by controlling operation of the first set without using the second set to change the line frequency. Some examples further include the first set, wherein the one or more electrical devices of the first set includes electricity consuming and/or electricity generating devices. Some examples further include the second set, wherein the one or more electrical devices of the second set includes electricity consuming and/or electricity generating devices. Some examples further include a detector coupled to the microgrid that detects the line frequency and sends the line frequency detection data to the second set control circuitry so that the second set control circuitry can provide the adjusting of operation of the second set. In some examples, the second set of one or more electrical devices comprise at least a high priority set of electrical devices and a low priority set of electrical devices, wherein the adjusting of operation comprises adjusting operation of the low priority set of electrical devices in response to the detected line frequency and a line frequency trigger associated with the low priority set of electrical devices without adjusting operation of the high priority set of electrical devices. In some examples, the control circuitry is configured to control a line voltage of the microgrid by directing a first set of one or more electrical devices coupled to the microgrid to produce a change in the line voltage through a change in operation of the first set, such that the second set of one or more electrical devices coupled to the microgrid adjusts operation in response to a detected line voltage changeably produced by the first set.

According to another aspect of the disclosed technology, methods include selecting a line frequency of a microgrid that is within a predetermined range associated with control of one or more electrical devices coupled to the microgrid, and adjusting the line frequency to the selected line frequency so that the one or more electrical devices change operation in response to detecting the adjusted line frequency.

According to another aspect of the disclosed technology, apparatus include a detector configured to detect a line frequency of a microgrid, wherein the detected line frequency corresponds to a control command for one or more electrical devices coupled to the microgrid, wherein the line frequency is independently controlled to vary within a range of microgrid line frequencies to produce the control command, and control circuitry configured to control the one or more electrical devices based on the detected line frequency corresponding to the control command. Some examples further include at least one of the one or more electrical devices coupled to the control circuitry and configured to be controlled by the control circuitry based on the detected line frequency.

According to another aspect of the disclosed technology, methods include detecting a line frequency of a microgrid, wherein the detected line frequency corresponds to a control command for one or more electrical devices coupled to the microgrid, wherein the line frequency is independently controlled to vary within a range of microgrid line frequencies to produce the control command, and controlling the one or more electrical devices based on the detected line frequency.

According to another aspect of the disclosed technology, apparatus include control circuitry configured to control a line voltage of a microgrid by directing a first set of one or more electrical devices coupled to the microgrid to produce a change in the line voltage through a change in operation of the first set, such that a second set of one or more electrical devices coupled to the microgrid adjusts operation in response to a detected line voltage changeably produced by the first set.

The foregoing and other features and advantages of the disclosed technology will become more apparent from the following detailed description, which proceeds with reference to the accompanying figures.

DETAILED DESCRIPTION

General Considerations

Figure 1:
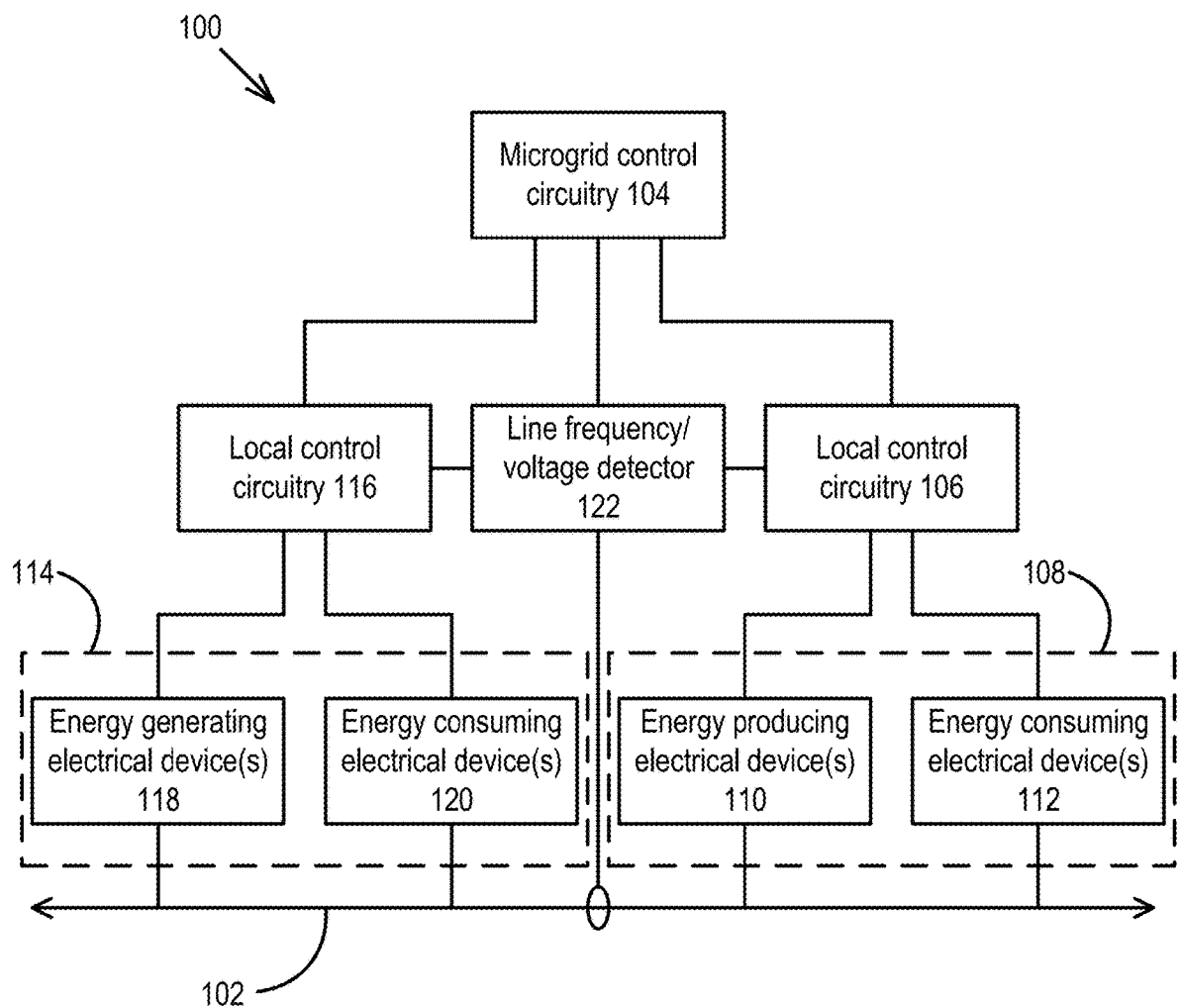
FIG. 1 is a schematic of a monitoring and control system for a microgrid.

Disclosed herein are representative examples of methods, apparatus, and systems that can be used to monitor and/or control devices coupled to microgrids. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any one or more features or aspects of the disclosed embodiments can be used alone or in various combinations and subcombinations with one another. The disclosed methods, apparatus, and systems are not limited to any specific aspect or feature or combination thereof, nor do the disclosed embodiments require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms may vary depending on the particular implementation and are readily discernible by one of ordinary skill in the art. Furthermore, in general, and as used herein, the term "optimal" describes a solution that satisfies some set of criteria better than other solutions according to some parameterization or modeling, which may or may not be optimal in absolute terms depending on circumstances, and the term "optimize" or "optimization" is used to indicate the process of finding such a solution. Furthermore, as used herein, the term "and/or" means any one item or combination of items in the phrase. As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

Any of the embodiments disclosed herein can be used to the extent suitable with any of the transactive control schemes and architectures described in U.S. Pat. No. 8,639,392 issued on Jan. 28, 2014, and entitled "ELECTRIC POWER GRID CONTROL USING A MARKET-BASED RESOURCE ALLOCATION SYSTEM,"; U.S. Pat. No. 9,425,620 issued on Aug. 23, 2016, and entitled "NESTED, HIERARCHICAL RESOURCE ALLOCATION SCHEMA FOR MANAGEMENT AND CONTROL OF AN ELECTRIC POWER GRID"; U.S. Nonprovisional application Ser. No. 14/108,078 filed on Dec. 16, 2013, and entitled "TRANSACTIVE CONTROL AND COORDINATION FRAMEWORK AND ASSOCIATED TOOLKIT FUNCTIONS" (and published as U.S. 2014/0172503); and U.S. Pat. No. 9,762,060 issued Sep. 12, 2017, and entitled "DISTRIBUTED HIERARCHICAL CONTROL ARCHITECTURE FOR INTEGRATING SMART GRID ASSETS DURING NORMAL AND DISRUPTED OPERATIONS"; all of which are hereby incorporated herein by reference in their entirety.

Embodiments of the disclosed methods can be performed using computing hardware, such as computer processors, integrated circuits, control circuitry, controllers, etc. Any of the disclosed methods can be implemented using computer-executable instructions stored on one or more computer-readable media (e.g., non-transitory computer-readable media, such as one or more optical media discs, volatile memory components (such as DRAM or SRAM), or non-volatile memory components (such as hard drives)) and executed by a processor in a computing device (e.g., a computer, such as any commercially available computer). Any of the computer-executable instructions for implementing the disclosed techniques as well as any intermediate or final data created and used during implementation of the disclosed systems can be stored on one or more computer-readable media (e.g., non-transitory computer-readable media). The computer-executable instructions can be part of, for example, a dedicated software application executed on a single computer or controller or on a networked computer or networked controller (e.g., via the Internet, a wide-area network, a local-area network, a client-server network, a cloud-based network, a DeviceNet network, a ControlNet network, an EtherNet/IP network, or other such network). Computing devices, controllers, and control circuitry can be embedded in or electrically coupled to detectors/sensors or other devices coupled to the microgrid and can be networked to other computing devices, controllers, and control circuits.

Such software can be executed on a single computing device (e.g., a computer, controller, or control circuitry, embedded in or electrically coupled to a sensor, controller, or other device in the power grid) or in a network environment. For example, the software can be executed by a computer embedded in or communicatively coupled to a sensor for measuring electrical parameters of a power line, such as a line frequency and/or voltage sensor, a smart meter, a control unit for a home or household appliance or system (e.g., an air-conditioning unit; heating unit; heating, ventilation, and air conditioning (HVAC) system; hot water heater; refrigerator; dish washer; washing machine; dryer; oven; microwave oven; pump; home lighting system; electrical charger; electric vehicle charger; home electrical system; or any other electrical system having variable performance states), a control unit for a distributed generator (e.g., photovoltaic arrays, wind turbines, or electric battery storage/charging systems), a control unit for controlling the distribution or generation of power along the power grid (e.g., a transformer, switch, circuit breaker, generator, resource provider, or any other device on the power grid configured to perform a control action), and the like. Household appliances, battery storage, distributed generators (along with any associated control unit), and other described devices are examples of "electrical devices" discussed herein. As more fully explained below, these devices can be monitored, coordinated, and/or controlled in disclosed embodiments.

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C, C++, Java, Perl, JavaScript, Adobe Flash, Python, JINI, .NET, Lua, ladder logic, or any other suitable programming language or platform. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions which when executed by a computer cause the computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by a computing device comprising an integrated circuit (e.g., an application specific integrated circuit (ASIC) or programmable logic device (PLD), such as a field programmable gate array (FPGA), programmable logic controller (PLC), complex programmable logic device (CPLD)). The integrated circuit or specialized computing hardware can be embedded in or directly coupled to a sensor, control unit, or other device in the power grid, including other controllers, relays, contactors, inverters, etc. For example, the integrated circuit can be embedded in or otherwise coupled to a line frequency detector, smart meter, control unit for a home or household appliance or system, a control unit for a distributed generator, a control unit for a battery storage system, a control unit for controlling power distribution on the grid, or other such device.

Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)) and are considered to be within the scope of this disclosure. Furthermore, any of the software embodiments (comprising, for example, computer-executable instructions which when executed by a computer cause the computer to perform any of the disclosed methods), intermediate results, or final results created or modified by the disclosed methods can be transmitted, received, or accessed through a suitable communication means.

Introduction to the Disclosed Technology

In some examples, a grid-friendly appliance controller (an example of such is described in U.S. Pat. Nos. 7,420,293; 7,010,363; 7,149,605; 8,073,573; 8,478,452; 9,310,792; incorporated herein by reference) can be used to read and monitor frequency to control devices, including energy storage devices, in a microgrid. This is particularly useful in a microgrid environment where microgrids (which are relatively small electric circuits) are made to collaborate toward a local objective. Remote locations and islands, for example, manage their grids independently of mainland grids and can be understood to be microgrids in many examples. Changes in electric power grid frequency (also referred to as "line frequency" herein) are an indicator of the history of balance (and imbalance) between electricity supply and demand, in both mega-grids and microgrids. However, in mega-grids, large central authorities control grid frequency and due to the size of mega-grids, the grid frequency does not typically change by substantial amounts, e.g., in response to a single small power plant coming online. But in microgrids, a smaller, local authority can be responsible for the grid's frequency. In accordance with examples herein, electric consumption, generation, and storage devices can be made to respond to grid frequency in microgrids, and herein "microgrid" generally refers to a power grid in which the line frequency is sufficiently controllable to generate commands using control over the line frequency to frequency-responsive devices coupled to the power grid. Devices will typically operate according to various rules and conditions to consume more (generate less) when the grid frequency is relatively high and consume less (generate more) when the grid frequency is low. Therefore, frequency-responsive devices may be controlled by controlling the microgrid's line frequency. Frequency-responsive controllable devices can include energy storage devices, which have an intrinsic state of charge that is depleted or recharged as these devices discharge and charge. Example microgrid controllers can estimate status of available energy storage energy, using line-frequency-based device control conditions and strategies and history of grid frequency. Monitoring and control using line-frequency-based commands can also make and use inferences about other usages of the energy storage for other incentives (e.g., prioritizing renewable sources) or for customer utility (e.g., comfort settings, cost savings, etc.). By tracking the line frequency of power used by frequency-responsive devices coupled to a microgrid, the control behavior and state of the frequency-responsive devices can also be estimated given knowledge or inference of the control strategies of the frequency-responsive devices. This can be used to estimate characteristics of the frequency-responsive devices such as state of charge, heating, cooling, etc. The status of frequency-responsive energy storage devices' states of charge can be monitored using the recent history of microgrid frequency. Complex frequency-responsive devices with multi-dimensional control strategies (e.g., controlling a building's interior temperature based on a current state and other variables such as occupant satisfaction) can also have states that are estimated or inferred and thereby monitored and controlled in some examples. Thus, the line frequency can be further controlled and used to control the frequency-responsive devices using the various estimates, and representative examples can use responsiveness of GFA (or other devices) to frequency regulation and regulation of grid frequency to arbitrary levels or patterns in order to monitor and manage the microgrid.

FIG. 1 shows an example monitoring and control system 100 for a microgrid 102. The system 100 uses control over line frequency of the microgrid 102 to cause various electrical devices coupled to the microgrid 102, including devices that generate electricity and devices that consume electricity, to be responsive to the line frequency to change operation. In some examples of the monitoring and control system 100 or other embodiments, line voltage can be used instead of line frequency or both line frequency and line voltage are used. For example, control over the line voltage of the microgrid 102 can cause various electrical devices coupled to the microgrid 102 to be responsive to the line voltage to change operation. In some examples, control over line frequency and line voltage can be combined to be dependent on each other, such as by having a selected line frequency command initiating a listening session for a subsequent line voltage command. In such examples using line voltage, one or more voltage detectors are used to provide line voltage information for controllers and coupled devices. Thus, herein, "line voltage" can be substituted for or supplement "line frequency" in any of the disclosed examples and further reference to voltage is generally omitted for convenience. Microgrids generally include smaller scale power grids, such as island power grids, off-grid homes, isolated communities, etc., in which control of line frequency (and voltage) is possible. For example, microgrid control circuitry 104 can be coupled to local control circuitry 106 to issue line frequency (or voltage) commands for controlling a first set of electrical devices 108. Different microgrids are capable of issuing different types of line frequency (voltage) commands based on microgrid characteristics, such as size (e.g., a single home, 10 homes, 5000 homes), battery capacity, power generation sources and capabilities, etc.

The first set of electrical devices 108 can include one or more energy generating devices 110 and/or one or more energy consuming electrical devices 112. Examples of electrical devices 108 are numerous, and in typical examples, suitable first set electrical devices 108 are devices that can produce or consume electricity and that can be controlled to produce predetermined changes in the line frequency of the microgrid 102. Examples can include electrical generators such as diesel, hydro, geothermal, solar, etc., as well as battery backups, resistive loads, inductive loads, etc. For clarity, the local control circuitry 106 is coupled to both the devices 110, 112 but separate local circuitries can be provided for different devices or sets of devices including sets of devices that include energy generating and energy consuming devices. The microgrid control circuitry 104 can issue line frequency commands based on various microgrid operational rules, requirements, triggers, histories of operation, etc., autonomously and/or manually or with manual override. Because a size of the microgrid 102 is sufficiently small or well-coordinated to prevent distributed controllers to counteract control to a specific frequency setpoint other than a nominal target (e.g., 60 Hz), changes in operation of the energy producing devices 110 and/or energy consuming devices 112 can directly adjust the line frequency of alternating power transmission over the microgrid 102 so that the control commands issued by the microgrid control circuitry 104 and local control circuitry 106 can directly produce a change in the line frequency of the microgrid 102. For example, to increase the line frequency from 60 Hz to 60.5 Hz, an energy producing diesel generator as an example of one of the energy producing electrical devices 110 can be commanded to increase power generation, such as through open loop control, closed loop feedback control, or other control methods. Alternatively, or in conjunction, one of the energy consuming electrical devices 112 such as a controllable load (including elements of energy producing devices that operate to throttle energy production and maintain line frequency) can be commanded to decrease power consumption. Thus, devices of the first set of electrical devices 108 can be used to controllably increase, decrease, and/or maintain the line frequency of the microgrid 102. In some examples, the line frequency is controlled to follow a predetermined microgrid load profile. For example, the microgrid 102 can be configured such that resources are dispatched in an order from least expensive to most expensive. It can be economical to flatten grid load so as to make sure that expensive resources are avoided. Such flattening can be achieved if, for example, frequency is set at a predetermined level, such as a high level, while load is at its minimum (inexpensive supply) and frequency is set at another predetermined level, such as a low level, while load is at its maximum (expensive marginal supply). Example changes to frequency can be configured to reduce or dissuade energy use while a free renewable resource, such as solar, is unavailable, and increased or encouraged while solar such free renewable resource is available.

In representative examples, the line frequency is changed to specific amounts associated with various line frequency thresholds. In some examples, more complex shapes for the changes in the line frequency can be selected and commanded, including multiple thresholds, sinusoidal variations, periodic shapes, arbitrary shapes, etc. Line frequency variations (with respect to time and/or frequency) can also be configured to produce shapes or changes tailored as commands for controlling devices, including different shapes for controlling different electrical devices. Line frequency variations can include pulses of line frequency changes with fixed or variable pulse durations. For example, a change in line frequency from 60 Hz to 59.5 Hz can be produced by the first set of electrical devices 108 with a detectable duration, such as 100 s, 10 s, 1 s, 1 ms, 1 μs, etc. Changes in line frequency can correspond to digital or binary signals. Representative examples can be configured to provide immediate grid assistance without requiring discernment of signals from events requiring immediate attention.

The monitoring and control system 100 includes a second set of electrical devices 114 that use a detected line frequency of the microgrid 102 to change operation using local control circuitry 116. The second set of electrical devices 114 can include one or more energy producing electrical devices 118 and/or energy consuming electrical devices 120, such as household appliances, battery systems, solar arrays, etc. By way of example, one or more of the electrical devices 114 may be controlled by a Grid Friendly Applicant controller, such as any described in U.S. Pat. Nos. 7,420,293, 7,010,363, 7,149,605, and/or 8,073,573. A non-exhaustive list of examples of appliances includes water heaters, refrigerators, coffee makers, clothes washers, water pumps, water management systems, dish washers, clothes dryers, air conditioners, cabin heaters, heating, ventilation, and air conditioning (HVAC) systems, thermostatic loads, computers, lighting systems, audio-visual devices, computing devices, car charging systems, etc. Different devices or classes of devices can be associated with different line frequency and/or voltage thresholds, and can be controlled using the microgrid control circuitry 104 in different ways (and with different line frequency and/or voltage thresholds or triggers) based on the different characteristics and capabilities of the devices.

The monitoring and control system 100 can also include a line frequency detector 122 coupled to the microgrid 102 to detect one or more characteristics of the microgrid 102, such as the line frequency of the microgrid 102, line voltage, both line frequency and line voltage, or another grid characteristic. The line frequency and/or voltage can be coupled to the local control circuitry 106, the local control circuitry 116, and/or the microgrid control circuitry 104 so as to provide detection data describing grid characteristics, such as the line frequency and/or voltage of the microgrid 102. As shown, the line frequency detector 122 is a singular device that is coupled to various devices to provide a line frequency. In some examples, the line frequency detector 122 can be coupled to local components to provide local line frequency detection. In representative examples, devices or local control circuitry can be configured with separate line frequency detectors. With separate detectors, control and monitoring of the microgrid 102 can benefit from distributed detection, which can simplify coupling additional electrical devices or classes of components to the microgrid 102 and avoid the need for additional inter-controller communications. In further examples, a line frequency detection signal can be transmitted from one or more devices to one or more other devices, such as from the microgrid control circuitry 104 to each other control circuitry or electrical device, or from one electrical device to another electrical device of the same or a different set. As shown the second set of electrical devices 114 forms a disjoint set with respect to the first set of electrical devices 108, though it will be appreciated overlap of the sets 108, 114 is also possible in some embodiments. In some examples, devices that produce commanded changes in line frequency can also be responsive to change operation with selected line frequency variations.

The monitoring and control system 100 can be configured to monitor the line frequency of the microgrid 102 and to change operation of devices of the second set of electrical devices 114 in response to the detected line frequency, using the first set of electrical devices to produce specific changes to the line frequency. For example, the microgrid control circuitry 104 can command the local control circuitry 106 to control the energy producing electrical device 110 of the first set of electrical devices 108 to increase the line frequency of the microgrid 102 by a selected amount above a predetermined line frequency control threshold associated with one or more of the energy consuming devices 120 of the second set of electrical device 114. In another example, the microgrid control circuitry 104 can command the local control circuitry 106 to control the energy producing electrical device 110 of the first set of electrical devices 108 to decrease the line frequency of the microgrid 102 by a selected amount below a predetermined line frequency control threshold associated with one or more of the energy consuming devices 120 of the second set of electrical device 114. In response to the line frequency passing a predetermined line frequency control threshold, one or more devices of the second set of electrical devices 114 can controllably adjust operation, such as being allowed to use energy, to not use energy, to cycle power, to reduce use of energy, to increase use of energy, to change power use characteristics (maximum power, power ramp, duty cycle, etc.), etc. In some examples, other changes to operation and line frequency dependent change to operation can be provided. In some examples, a plurality of devices of the one or more energy consuming devices 120 can have associated line frequency thresholds that are different from each other. Sets of electrical devices can have a distribution of line frequency thresholds (or other line frequency-based commands to be responsive to), and define a continuous responsiveness for changes in grid frequency. In some examples, the distribution can be configured so that a change in line frequency produced by the first set of electrical devices 108 produces a proportional change in operation of the second set of electrical devices 114. For example, a collection of water heaters on a microgrid can be randomly assigned a distribution of line frequency thresholds such that a proportion of the water heaters coupled to the microgrid operates in a low power mode or other mode as the line frequency changes in the range of the distribution. Example distributions can be assigned randomly such that probabilities can be used to assign thresholds for different electrical devices of a set. Suitable probabilities can include flat distributions and non-flat distributions (including Gaussian, skewed, etc.). Distributions can be assigned to electrical devices statically, randomly, and can be changed and/or redistributed periodically (such as once a day, once a week, etc.). Distributions and/or line frequency thresholds can be different for different types of electrical devices. In selected examples, increasing numbers of devices of the second set of electrical devices 114 can change operation to reduce power draw or rendered inoperable as line frequency changes in a selected direction, thereby spreading out responses of individual devices so that altogether devices may turn on or off (or variably), e.g., sequentially. The response of the population of electrical devices can be made to appear as a continuous response, such as a single large item turning up or down. For example, a power saving or power critical mode for the microgrid 102 can be defined such that the microgrid control circuitry 104 uses line frequency control to allow selected devices to operate (such as refrigerators) while other devices are commanded to stop operation or operate in a reduced power mode (such as water heaters). In some examples, adjusted operation of the devices of the second set of electrical devices 114 can include operating in a variable duty cycle mode where duty cycle varies across a predetermined range (which can also be different for different devices or types of devices) of line frequencies so as to define a continuous response to line frequency. In selected examples, thresholds are distributed across line frequency and randomly assigned to a population of electrical devices on the microgrid 102 so that even on/off changes can be made to look like one large power consuming item smoothly changing in power consumption with change in line frequency. In some examples, different electrical devices of the same type, or different sets of electrical devices can be responsive to different line frequencies. For example, a device or set of devices can be given priority over another device or set of devices based on various conditions or rank, such as power unit price, extent or type of power generation (such as by rewarding a residential house or grid section that generates more renewable energy than another), usage patterns, priority queue, emergency scenarios, etc.

Frequency responsive devices of the second set of electrical devices 114 can also be provided with a selectable sensitivity to frequency response. For example, different sensitivities can define different mode-wise sets of behaviors. By way of example, the second set of electrical devices 114 could have a high sensitivity to frequency deviation when connected to the standard power grid (because frequency is highly regulated) and a lower sensitivity where coupled to microgrids, where frequency is not so closely regulated to a single value, and a relatively larger frequency range may be used for control purposes. Various modes can be defined depending on the microgrid or other conditions, such as pre-triggering behaviors during or in advance of adverse weather conditions.

Figure 2:
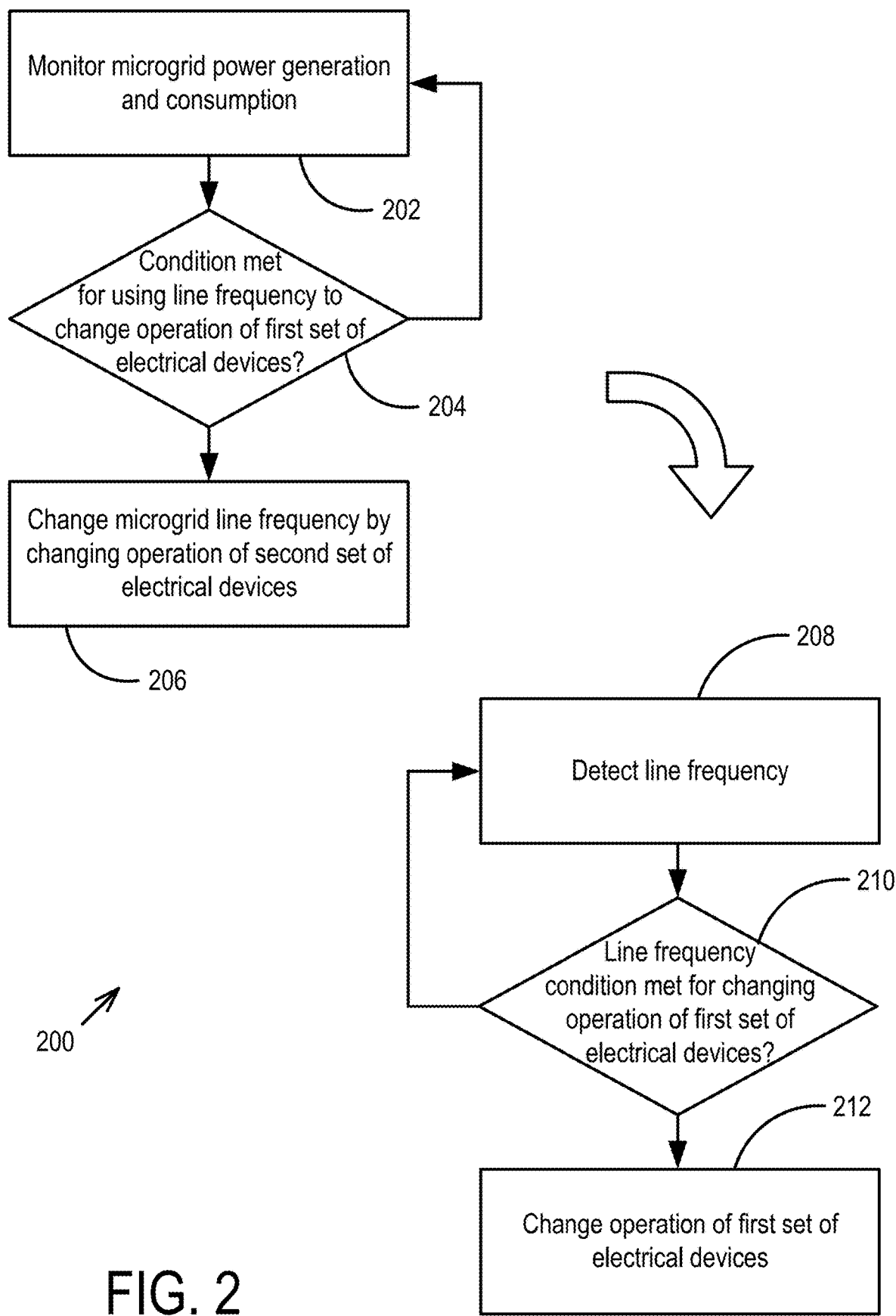
FIG. 2 is a flowchart of an example monitoring and control method for a microgrid.

FIG. 2 shows an example monitoring and control method 200 for electrical devices coupled to a microgrid. As with the other disclosed examples, the monitoring and control method 200 can be used with line frequency and/or line voltage, and reference to line voltage is omitted for convenience. At 202, a microgrid power generation, consumption, and/or other characteristics are monitored, and at 204, when a condition is met for using a controllable change in line frequency to change operation of a first set of electrical devices coupled to the microgrid, then at 206, the line frequency of the microgrid is changed by changing operation of a second set of electrical devices. Such monitoring need not be specific detection of a directly detectable parameter but can include estimates and other anticipatory projections based on available usage data and control history using frequency. For example, distributed storage could be configured to use available solar power and avoid expensive diesel power generation. At the same time as the line frequency is changed at 206, at 208, a line frequency of the microgrid is detected, and at 210, when a line frequency condition is met for changing operation of the first set of electrical devices, then at 212, the first set of electrical devices changes operation. For example, when it is determined that an excessive or unsustainable amount of power is being used by the microgrid, one or more diesel electric generators or battery banks of the second set of electrical devices can lower the line frequency of the microgrid from 60 Hz to 59.5 Hz. Then, one or more of the first set of electrical devices, such as water heaters or other household appliances or other electrical devices, uses the lower line frequency as a command to change operation by reducing power, such as by switching to an energy conserving mode.

Figure 3:
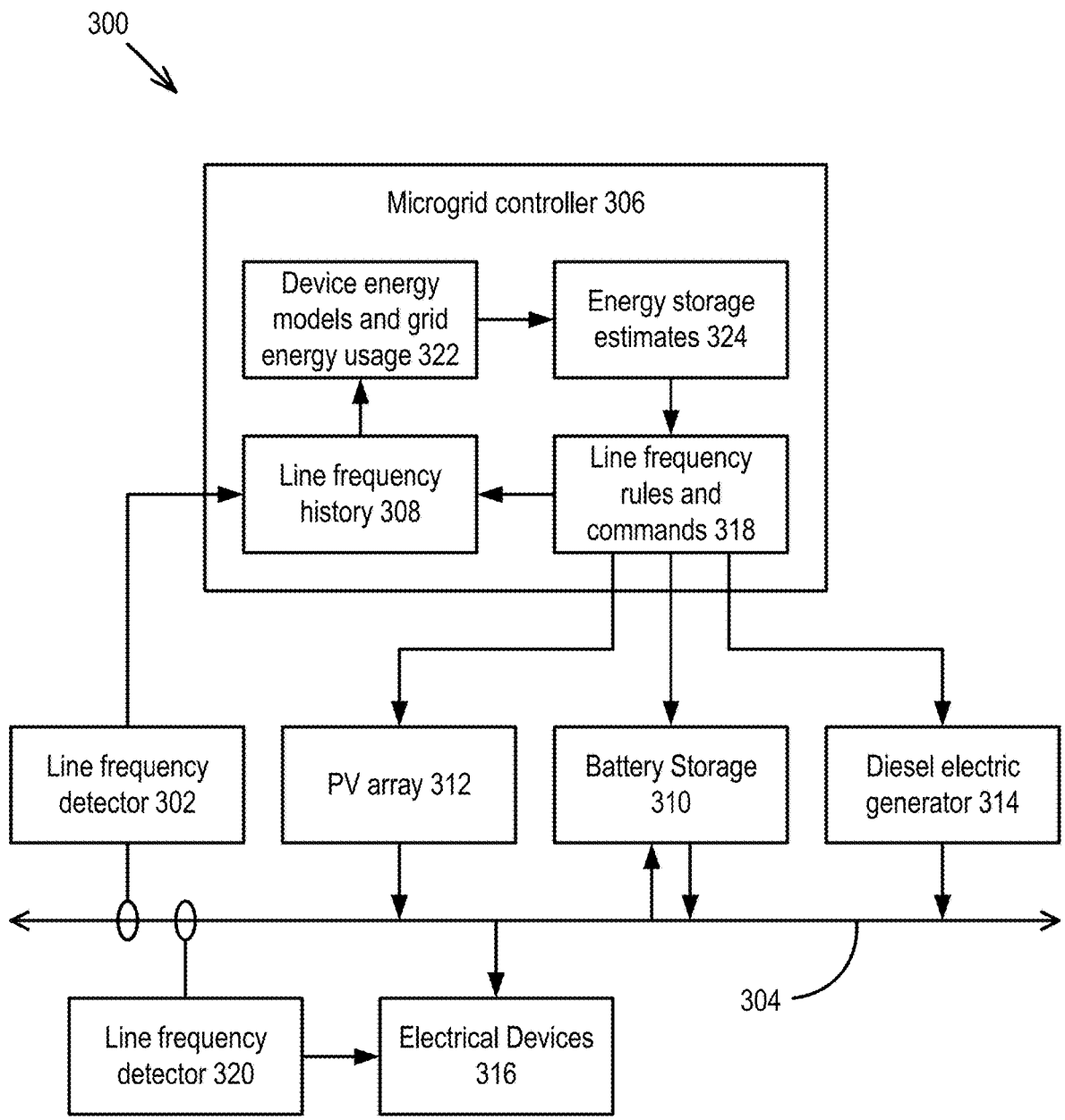
FIG. 3 is a schematic of another monitoring and control system for a microgrid.

FIG. 3 is an example microgrid monitoring and control system 300 that uses a line frequency detector 302 coupled to a microgrid 304 to detect a line frequency of the microgrid 304 and to use control over the line frequency, e.g., with a microgrid controller 306, and a history 308 of line frequency to manage devices coupled to the microgrid 304. For example, the microgrid 304 can include a battery storage 310 with predetermined characteristics such as capacity, charge and discharge capability, power cycling lifespan, etc., that can operate to consume energy (charge), release energy (discharge), or both, to the microgrid 304. A photovoltaic array 312 and diesel electric generator 314 are coupled to the microgrid 304 and configured to produce power for the microgrid. In general, the microgrid controller 306 can be configured to command the battery storage 310, photovoltaic array 312, and diesel electric generator 314 to produce energy for the microgrid 304 to power coupled electrical devices 316. For example, as microgrid loads increase, the microgrid controller 306 can command the diesel electric generator 314 to increase power generation, the photovoltaic array to increase power generation if available, and/or the battery storage 310 to increase discharge rate or decrease charge rate. In representative examples with the photovoltaic array 312, all of such power is used and power provided the diesel electric generator 314 is used for regulation, typically with photovoltaic power decreased only where it alone exceeds total demand on the microgrid 304. During normal operation, the commanded increase in power is typically controlled to match the load increase such that the line frequency of the microgrid 304 does not change.

The microgrid controller 306 can also include line frequency rules to issue line frequency commands 318 for the microgrid 304 that cause a change in line frequency, such as a simple increase or decrease to predetermined levels or other more complex changes, by increasing or decreasing energy production (or consumption) by the battery storage 310, photovoltaic array 312, diesel electric generator 314, or other electric producing or consuming devices, away from an equilibrium for a selected line frequency (such as 60 Hz). The electrical devices 316 can then detect the new line frequency of the microgrid 304, such as by receiving line frequency detection data from the line frequency detector 302 or other line frequency detectors, such as line frequency detector 320, and change operation in response to the detected line frequency. The battery storage 310 and/or other power generating/consuming electrical devices can also be responsive to line frequency to change operation instead of, or in addition to, being configured to receive the line frequency commands 318 directly from the microgrid controller 306. In some examples, battery storage 310 can be specifically configured to generate line frequency commands through line frequency changes by increasing or decreasing discharge/charge rates, including while retaining responsiveness to changing operation when a line frequency changes to various thresholds. Battery storage systems can be well suited for producing arbitrary changes to line frequency, including of very short duration, based on the solid state characteristics of such devices.

The microgrid controller 306 can also store in memory 322 model characteristics of various devices coupled to the microgrid, such as devices 310-316, as well as grid loading, consumption patterns, climatological characteristics (e.g., solar incidence, wind speed, heating/cooling degree days, ground temperature), etc. The microgrid controller 306 can use line frequency history 308 along with the model characteristics and/or grid loading in the memory 322 to provide energy estimates 324, e.g., a state of charge of the battery storage. Such an estimation can provide useful information to grid users or grid controllers that might not be otherwise directly available from the battery storage 310, particularly in a microgrid. In an illustrative example, the microgrid controller 306 can control the line frequency to a high frequency state $f_1$ long enough to ensure that the battery storage is fully charged, according to charging strategy of the battery storage that is known or estimated by the microgrid controller 306. The line frequency can later be reduced to a low frequency $f_2$, which is a frequency known by the microgrid controller 306 that causes the battery storage to induce full discharge of the battery storage, for 2 hours, to a ½ charge state after the two hours, given knowledge or estimate of the battery storage capacity being fully discharged after discharging for 4 hours. Knowledge or estimates of the battery storage characteristics can include battery chemistry in addition to capacity and other parameters, and can also be used to determine usage projections and optimize frequency command based control to optimize battery health (e.g., control of charging and discharging levels for lithium ion banks can be different lead-acid banks).

In some examples, the microgrid controller 306 can use the energy estimates 324 to select one or more of the line frequency commands 318 to provide responsive control of the microgrid 304. For example, while the microgrid controller 306 can control various devices to increase a power generation in response to an increased microgrid load and decrease a power generation in response to a decreased microgrid load, the microgrid controller 306 can also use the line frequency commands 318 to controllably adjust the line frequency of the microgrid so that the changed line frequency defines a command for the battery storage 310 to change operation. By way of example, in response to the line frequency history 308 and related energy estimates 324, the microgrid controller 306 can compare the estimates 324 to an energy storage threshold and generate one or more of the line frequency commands 318 to cause a line frequency change from a normal setpoint, such as 60 Hz (or other suitable line frequency, such as 50 Hz), to a lower line frequency such as 59.5 Hz. In response to the line frequency passing below 59.5 Hz, the battery storage 310 can proceed to discharge energy to the microgrid 304. Similarly, based on the line frequency history 308 and related energy estimates 324, the microgrid controller 306 can also generate one or more of the line frequency commands 318 to cause a line frequency change from a normal setpoint to above a higher line frequency, such as 60.1 Hz, and in response to the line frequency passing above the higher line frequency, the battery storage 310 can proceed to change from a normal idle, discharge, or other operation, to a charging mode, using energy from the microgrid 304, e.g., energy generated by the diesel electric generator 314 and/or photovoltaic array 312, to increase a state of charge of the battery storage 310. Because the microgrid controller 306 has information of the battery storage characteristics, retains the line frequency history 308, and has controllability over the battery storage 310 by changing the microgrid line frequency, the microgrid controller 306 can estimate the operational state of the battery storage (such as state of charge) so that suitable line frequency commands can be generated for the microgrid 304 under various conditions. For example, with estimates 324 projecting that the battery storage 310 is in a depleted state, the microgrid controller 306 can issue various line frequency commands 318 that cause a change from the depleted state to a replenished state or that prevent further depletion, such as by preventing discharge by the battery storage 310 and allowing charging to (or idling of) the battery storage 310. Other related commands to assist replenishment (or other battery storage management) can be issued by the microgrid controller 306, such as directly increasing generation by the diesel electric generator 314 or causing an increase in generation by the diesel electric generator 314 through issuance of one of the line frequency commands 318 and in response to detected line frequency change. Line frequency commands 318 can also be issued to cause one or more of the electrical devices 316 to switch to a low power mode to reduce electricity demand from the microgrid 304 so that the battery storage 310 can more easily be replenished. In some examples, the line frequency history 308 can be used to inform or provide information relating to different types of the electrical devices 316. For example, water heaters can be modeled (e.g., using lumped thermal capacitance, or another modeling technique) and the line frequency history 308 of related line frequency commands 318 that changed operation can be used to determine an extent to which the water heaters have warmed or cooled so that related control actions can be taken based on other conditions, such as peak demand projections, periodic or cyclic patterns or characteristics, etc.

In an example, the microgrid controller 306 can probe the microgrid 304 by commanding a change in line frequency causing various power generation (or consuming) sources, configured to respond to changes in line frequency as line frequency based commands, to operate in a predetermined manner in response to the change, or by otherwise directing a change in power generation or consumption of devices coupled to the microgrid 304. The microgrid controller 306 can observe a follow-on change in the line frequency of the microgrid 304 as the various devices change operation responsive to the line frequency based command or other command. From the observed change in line frequency, the microgrid controller 306 can estimate power generation and/or consumption characteristics for the microgrid 304.

Figure 4:
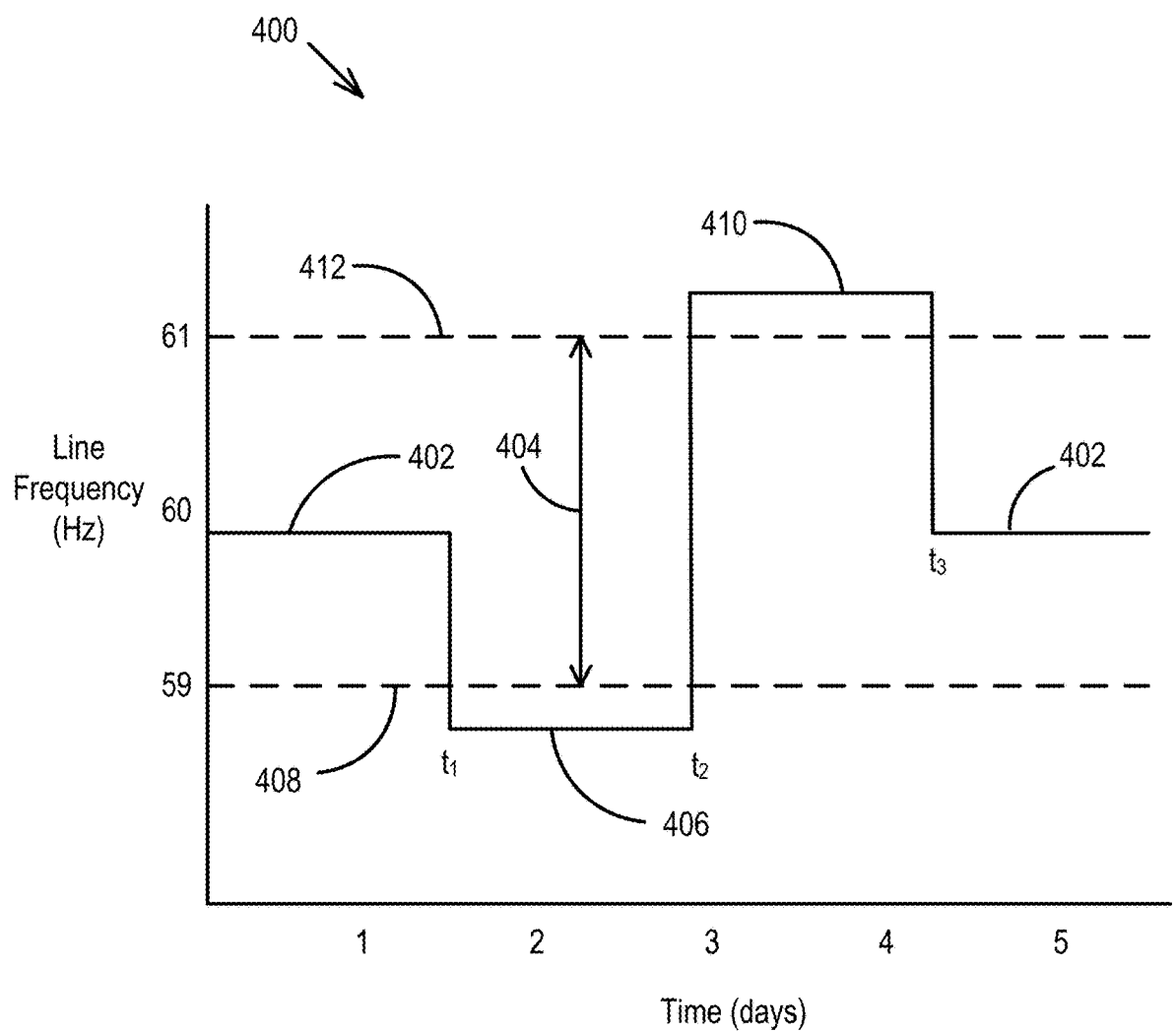
FIG. 4 is a graph of line frequency of a microgrid with respect to time.

FIG. 4 is a graph 400 of line frequency history of a microgrid. The line frequency of the microgrid is controllably changed with respect to time, e.g., with a power grid control circuitry, to command electrical devices on the microgrid to change operation. For example, a line frequency may be controlled around at a setpoint level 402 in a normal operational mode 404. Based on one or more conditions, at a time $t_1$, the line frequency is commanded to change and therefore changes to a lower line frequency level 406 that is below a specific line frequency threshold 408 of 59 Hz. One or more electrical devices coupled to the microgrid can detect the changed line frequency either internally or from an external detector or signal, and are responsive to change their operation. Conditions for commanding and changing line frequency to command various devices to change operation can include various conditions associated with the microgrid, including loading, consumption, demand, price, transactive indicators, supply availability, etc., and some examples can use the history of the line frequency and related device performance responsive to earlier line frequency characteristics as line frequency command conditions or as part of line frequency command conditions. For example, a duration at a selected line frequency can integrate and a condition can be reached when the duration exceeds a certain amount. At a time $t_2$, the line frequency is commanded to change and changes to a higher line frequency level 410, e.g., 61 Hz, based on one or more conditions, with the higher line frequency level 410 being above a predetermined line frequency threshold 412. One or more electrical devices coupled to the microgrid can detect the changed line frequency and change operation in response. At a time $t_3$, the line frequency is commanded to change and changes to the setpoint level 402 within the range of the normal operational mode 404, and one or more of the electrical devices coupled to the microgrid can be responsive to change operation based on the detected line frequency. While singular thresholds and step-based singular line frequency changes are convenient, other changes, including ramps, pulses, continuous thresholds, multiple thresholds, distributed thresholds, etc., can be suitable in various examples, and the line frequency history can similarly be retained and used as conditions for changing operation of various devices using line frequency changes as a command communication.

Figure 5:
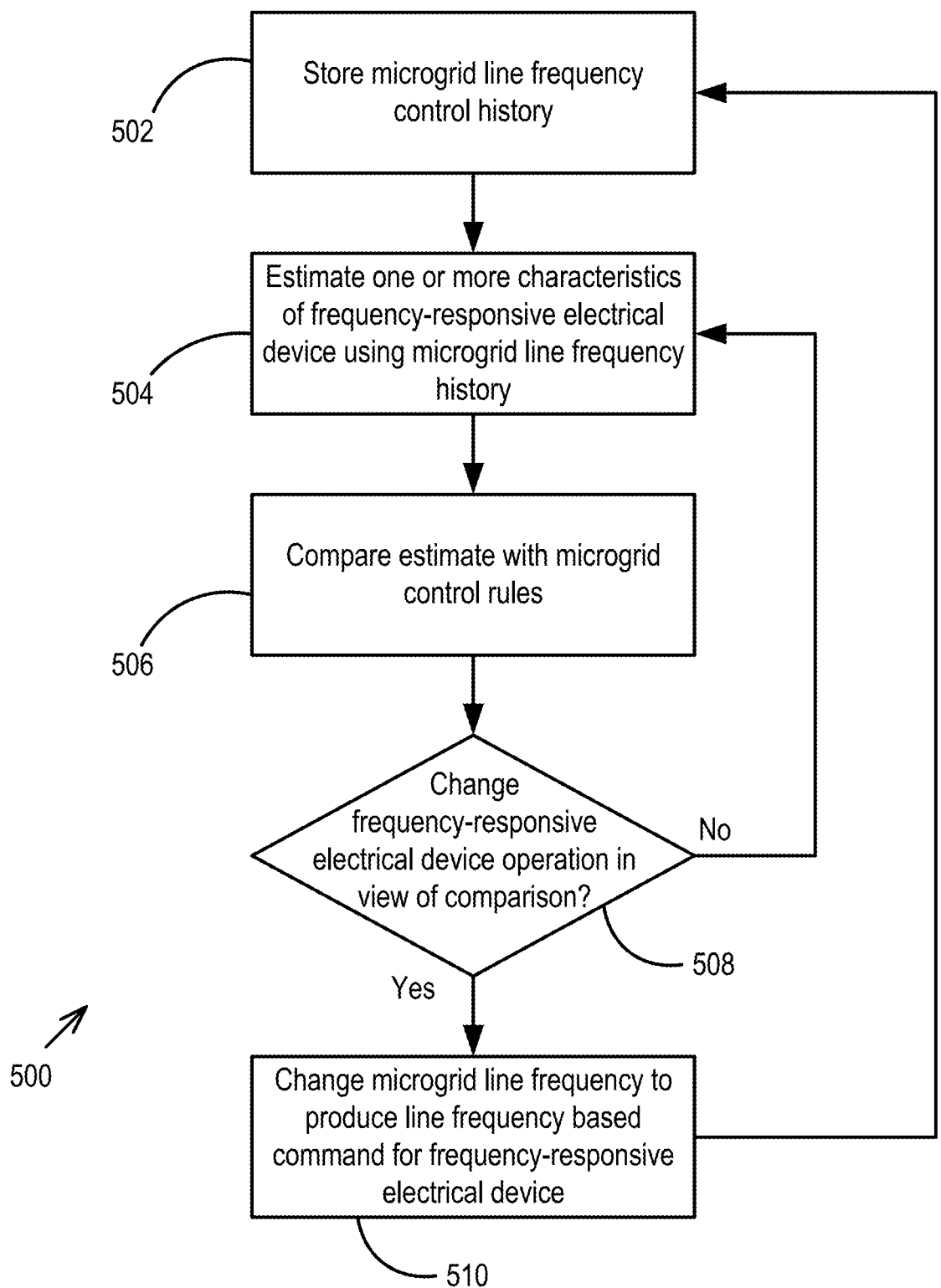
FIG. 5 is a flowchart of a method of using line frequency history in controlling frequency-responsive devices.

FIG. 5 depicts an example method 500 of using line frequency history of a microgrid to control frequency-responsive electrical devices or provide information regarding the frequency-responsive electrical devices coupled to the microgrid. At 502 a line frequency detection and/or control history is stored in a device memory. At 504, one or more characteristics of a frequency-responsive electrical device is estimated using the microgrid line frequency history. For example, an estimate for the state of charge of a battery storage device with a certain capacity can be estimated where the history of line frequency used by the battery storage device to provide responsive changes in operation, such as charging and/or discharging, is available as the control behavior can be correlated to the battery state. The estimate can be used to provide information regarding the state of the electrical device for users of the microgrid, including to control authorities and consumers. Estimates can be used to assist in manually controlling the battery storage or other electrical devices. Estimates can also be used to control other electrical devices coupled to the microgrid or for other purposes, such as by providing information for transactive control with other grids or electric power markets. Autonomous control over the battery storage or other electrical devices can be provided, e.g., at 506, by comparing the estimates obtained at 504 to one or more microgrid control rules. At 508, if the comparison indicates that the frequency-responsive electrical device should change operation, then at 510 the microgrid line frequency can be controllably changed to produce one or more line frequency based commands for the frequency-responsive electrical device to urge the change in operation of the frequency-responsive electrical device. The line frequency command and change in line frequency can be stored to further accumulate the line frequency storage history.

Figure 6:
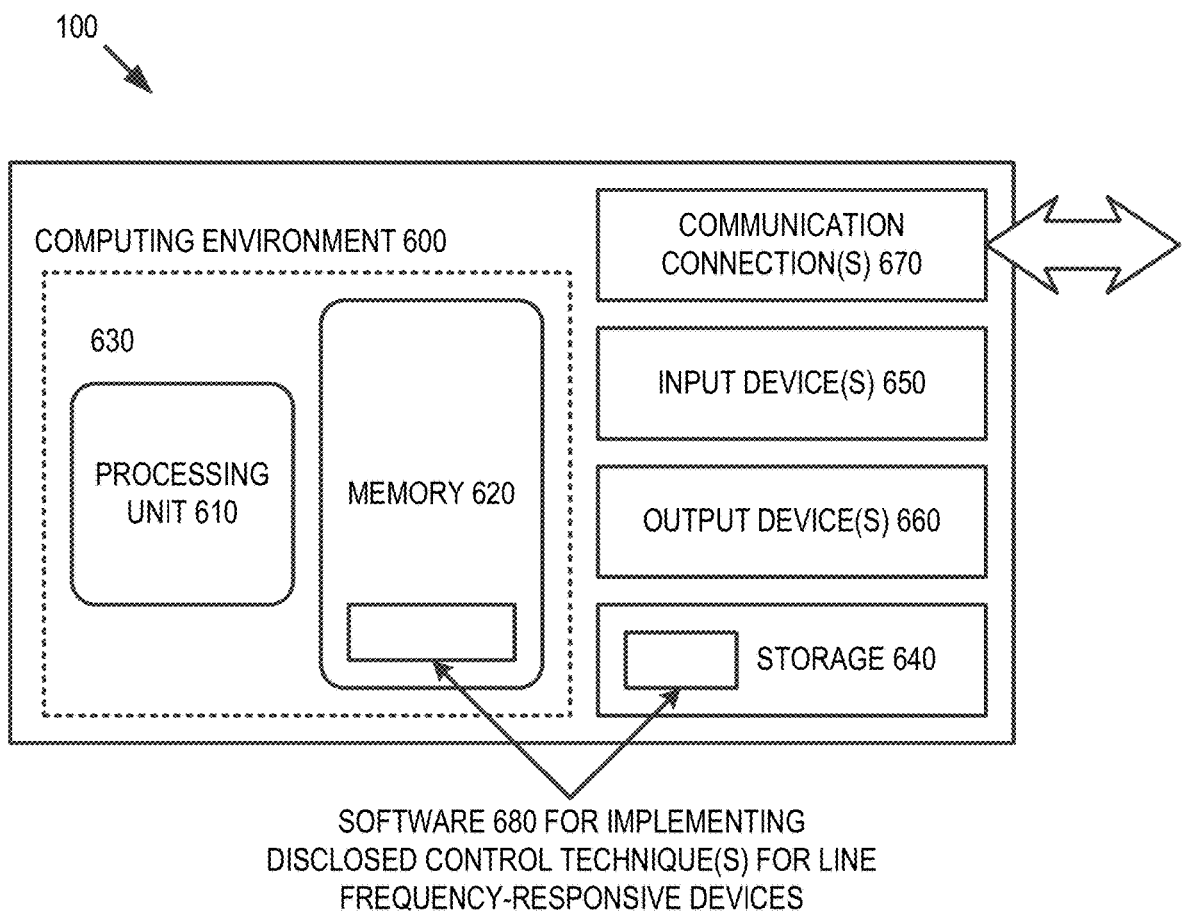
FIG. 6 is a schematic of an example computing hardware environment that can be used to implement disclosed embodiments.

FIG. 6 is a generalized example of a suitable computing hardware environment 600 for a computing device with which several of the described embodiments can be implemented. The computing environment 600 is not intended to suggest any limitation as to the scope of use or functionality of the disclosed technology, as the techniques and tools described herein can be implemented in diverse general-purpose or special-purpose environments that have computing hardware.

With reference to FIG. 6, the computing environment 600 includes at least one processing unit 610 and memory 620. In FIG. 6, this most basic configuration 630 is included within a dashed line. The processing unit 610 executes computer-executable instructions. In a multi-processing system, multiple processing units execute computer-executable instructions to increase processing power. The memory 620 may be volatile memory (e.g., registers, cache, RAM), non-volatile memory (e.g., ROM, EEPROM, flash memory), or some combination. The memory 620 stores software 680 for implementing one or more of the described techniques for operating or using the disclosed systems. For example, the memory 620 can store software 680 for implementing any of the disclosed techniques.

The computing environment can have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 can be removable or non-removable, and includes magnetic disks, magnetic tapes or cassettes, CD-ROMs, DVDs, or any other tangible storage medium which can be used to store information in a non-transitory manner and which can be accessed within the computing environment 600. The storage 640 can also store instructions for the software 680 implementing any of the described techniques, systems, or environments.

The input device(s) 650 can be a touch input device such as a keyboard, mouse, touch screen, pen, or trackball, a voice input device, a scanning device, or another device that provides input to the computing environment 600. The output device(s) 660 can be a display, touch screen, printer, speaker, or another device that provides output from the computing environment 600. In representative examples, input devices 650 can include detectors of line frequency, line voltage, and/or other power grid parameters.

The communication connection(s) 670 enable communication over a communication medium to another computing entity. The communication medium conveys information such as computer-executable instructions, line frequency commands, line frequency detection data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. Computer-readable media are any available media that can be accessed within or by a computing environment. By way of example, and not limitation, with the computing environment 600, computer-readable media include tangible non-transitory computer-readable media, such as memory 620 and storage 640.

The various methods, systems, and interfaces disclosed herein can also be described in the general context of computer-executable instructions, such as those included in program modules, being executed in a computing environment on a target processor. Generally, program modules include routines, programs, libraries, objects, classes, components, data structures, and the like that perform particular tasks or implement particular abstract data types. The functionality of the program modules may be combined or split between program modules as desired in various embodiments. Computer-executable instructions for program modules may be executed within a local or distributed computing environment.

As noted, the disclosed technology is implemented at least in part using a network of computing/controlling devices (e.g., any of the computing device examples described above). The network can be implemented at least in part as a Local Area Network ("LAN") using wired networking (e.g., the Ethernet IEEE standard 802.3 or other appropriate standard) or wireless networking (e.g., one of the IEEE standards 802.11a, 802.11b, 802.11g, or 802.11n or other appropriate standard). Furthermore, at least part of the network can be the Internet or a similar public network.

Additional Examples of Frequency Responsive Devices

In particular examples, responsive control over grid frequency can be tailored similar to underfrequency response control of water heater devices as disclosed in the "Final Letter Report: Grid-Responsive Demand-Side Control Using Friendly Appliance Technologies," prepared by D. J. Hammerstrom for the U.S. Department of Energy, November 2009, incorporated herein by reference.

Figure 7:
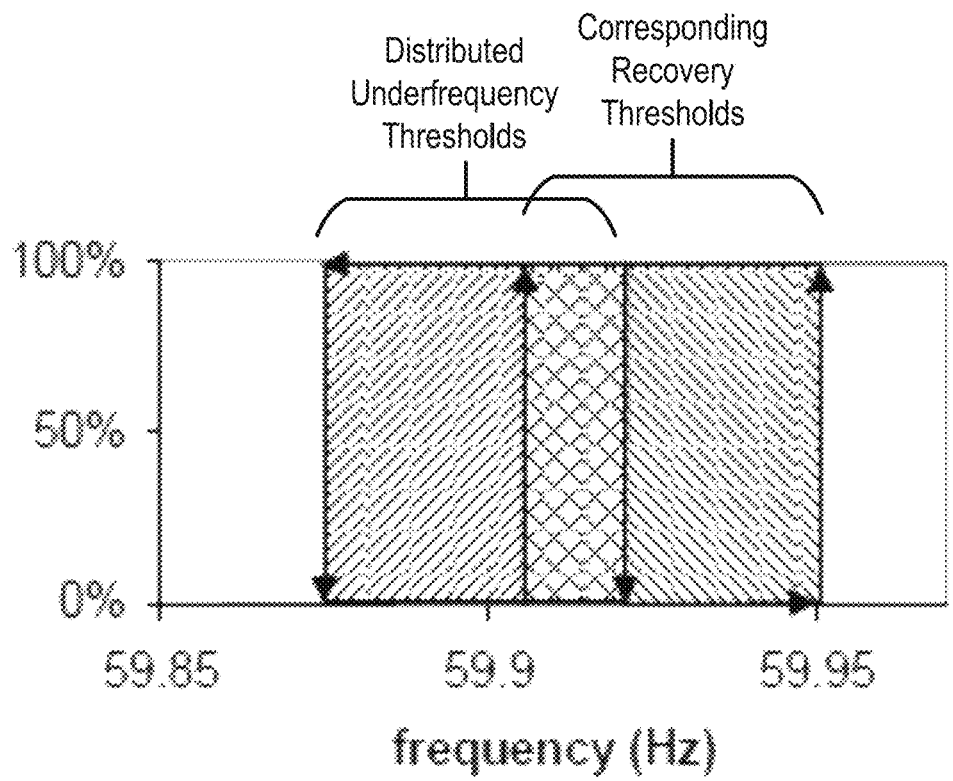
FIGS. 7-14 are graphs showing the effects of regulating water heaters based on grid frequency.
Figure 8:
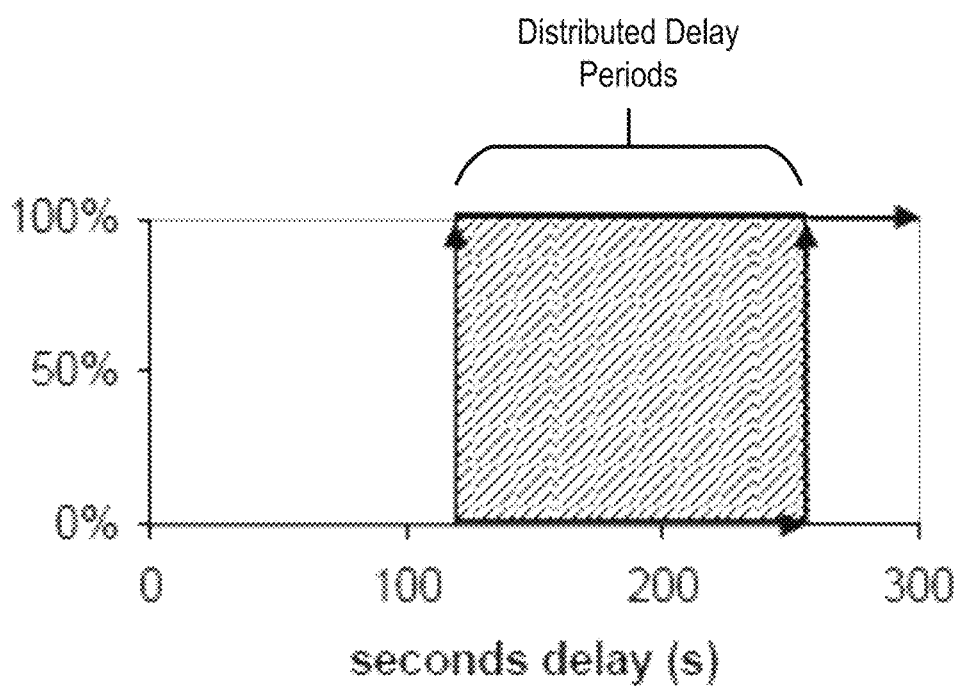

FIG. 7 shows a graph describing operation of an example frequency responsive water heater device. The water heater is configured to curtail its load should the device measure the line frequency at below a threshold evenly distributed between 59.920 Hz and 59.875 Hz for a period of 100 ms. For example, after an underfrequency event has been detected, the controller of the water heater will remain triggered and continue curtailing the load until the detected line frequency increases to a recovery threshold frequency of about 0.03 Hz above the threshold frequency that caused the water heater to trigger into curtailment, for a sufficient delay period. For example, the device can switch to a normal mode of operation after the detected line frequency increases to above a recovery threshold frequency evenly distributed between 59.906 Hz and 59.950 Hz for 100 ms (or another suitable period), and the detected line frequency remains above the recovery threshold frequency for a delay period evenly distributed from a minimum of 2 minutes to a maximum of 4.25 minutes, such as the period shown in FIG. 8, so as to reestablish population diversity.

Figure 9:
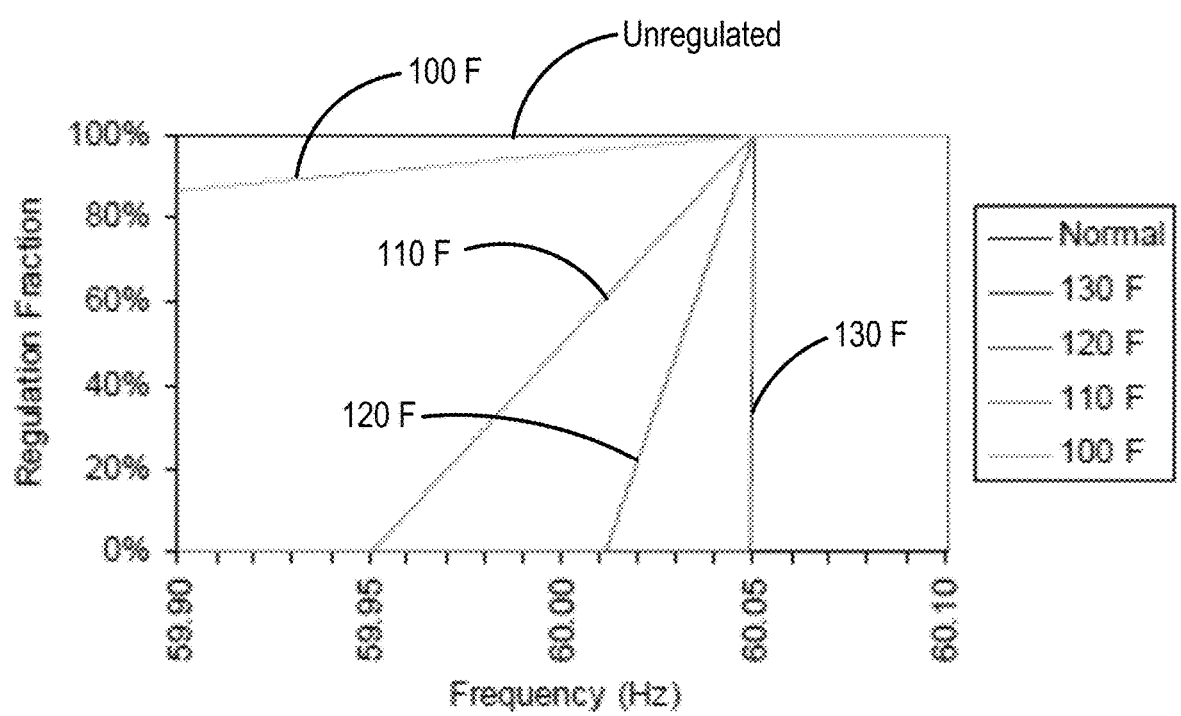
Figure 10:
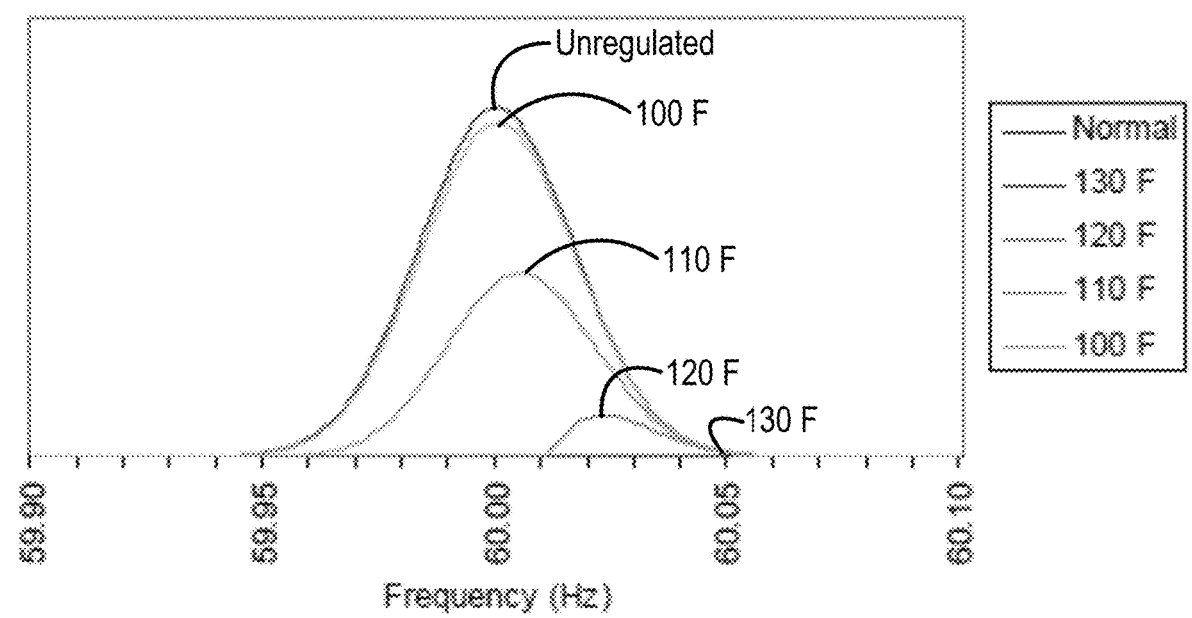

FIGS. 9-10 are graphs illustrating operation of another example frequency responsive water heater device that can provide a degree of both up and down regulation, and that is responsive to both water temperature and grid frequency. As shown, a regulation fraction represents the fraction of time the water heater is permitted to conduct during a cycle. The regulation fraction can also be understood to correspond to the average relative water heater power that is made available to heat water as a function of temperature and frequency. For example, an uncontrolled water heater has a regulation fraction of 100% because a variable line frequency does not reduce the water heater's effective water heating power. At 54.4° C. (130° F.), only that electrical power that is delivered at a frequency exceeding 60.05 Hz would be permitted to heat water. At 48.9° C. (120° F.), the water heater is allowed to operate approximately 6.5% of the time using 6.5% of the highest frequencies within the normal grid frequency distribution. In this respect, the water heater is allowed to maintain its average consumption at this temperature. As the measured water temperature decreases, an increasingly larger portion of the grid frequency distribution must be used to heat water to maintain user satisfaction.

In some examples, improved water heater regulation efficiency is obtained by setting the water heater's upper mechanical thermostat to between 43.3° C. (110° F.) and 48.9° C. (120° F.). The lower thermostat is generally set higher than 48.9° C. (120° F.) but below any potentially scalding temperature. In this way, the controller of the frequency responsive water heater can rapidly provide power to the upper heating element while water load is high and will then heat the lower half of the water tank where the grid frequency is relatively high. Thus, in some examples, a water heater control strategy can include controlling the line frequency to adjust it downward so that devices use less power for obtaining a certain water temperature and to adjust it upward to allow the use of power to obtain the water temperature. In some examples, control rules for adjusting grid frequency can be based on water heater or other device modeling of electricity use. For example, the first energy going to a water heater would warm up the upper reservoir as the primary source of heated water used, with heating of water in the lower cold reservoir being allowed to be delayed, e.g., by hours or days, so there are strategies between the ways you can control these based on the way they operate. Due to the reservoir characteristics specific to water heaters, heating and cooling can be manipulated, such as by allowing reservoir temperature to coast or to be overheated in various instances. Thus, with line frequency control of the microgrid, commands can be issued to a population of water heaters by changing grid frequency, and the water heaters can determine whether to adjust operation based on the grid frequency and a temperature state of the water heater. History of grid frequency can also be used to estimate average water heater temperature and available capacity. In a particular example, an interval of 17 seconds was selected over which to apply a regulation fraction in which the water heater is permitted to heat water for from 0% to 100% of the 17 second interval. For water heaters, the interval selection is typically a tradeoff between regulation accuracy, which favors short intervals, and high relay longevity, which favors long intervals. The 17 second interval was determined to be adequately short, though other shorter or longer intervals may be convenient. With control over the line frequency, shorter intervals and complex line frequency signal characteristics can be used, as the time over which grid frequency remains self-correlated can be made to increase.

Figure 11:
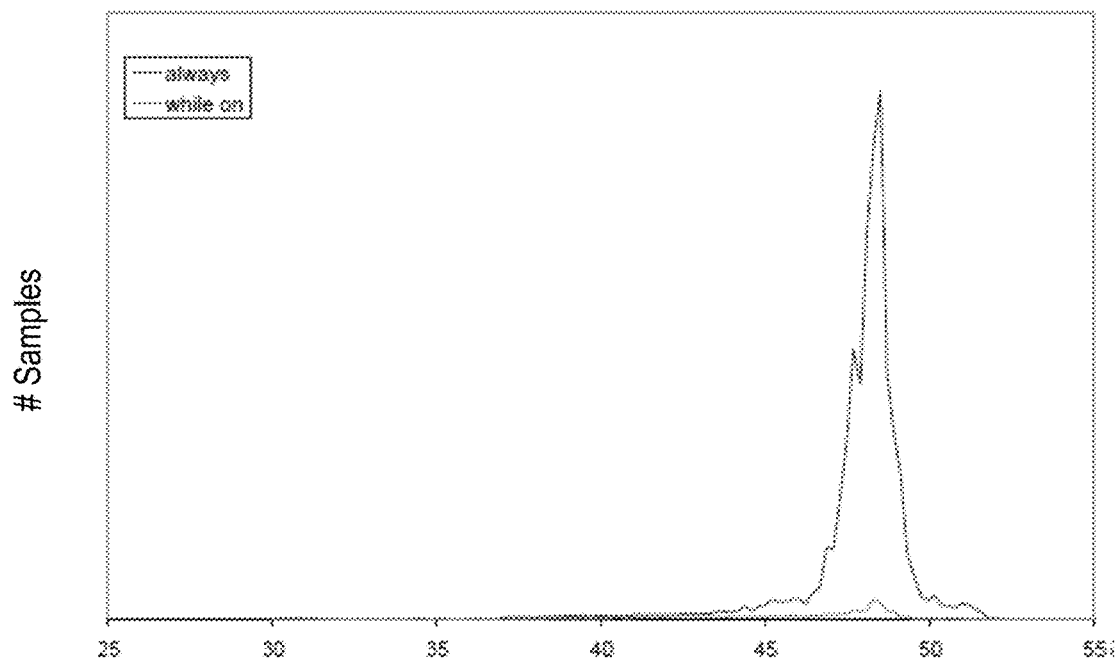
Figure 12:
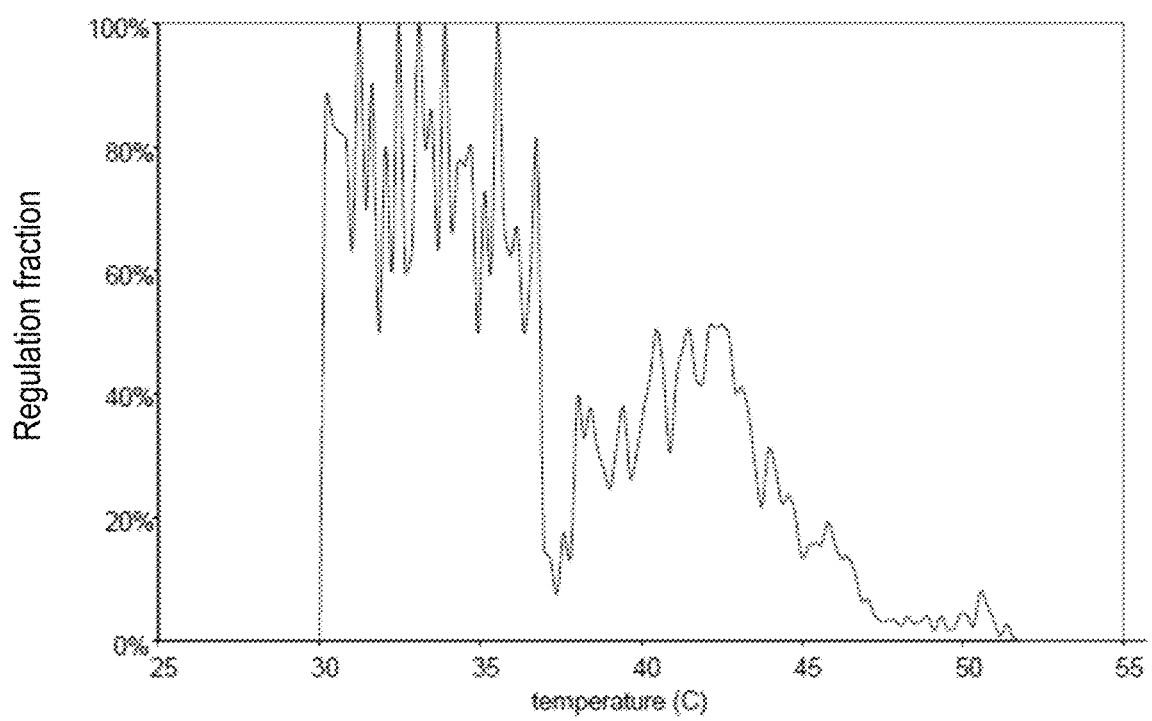
Figure 13:
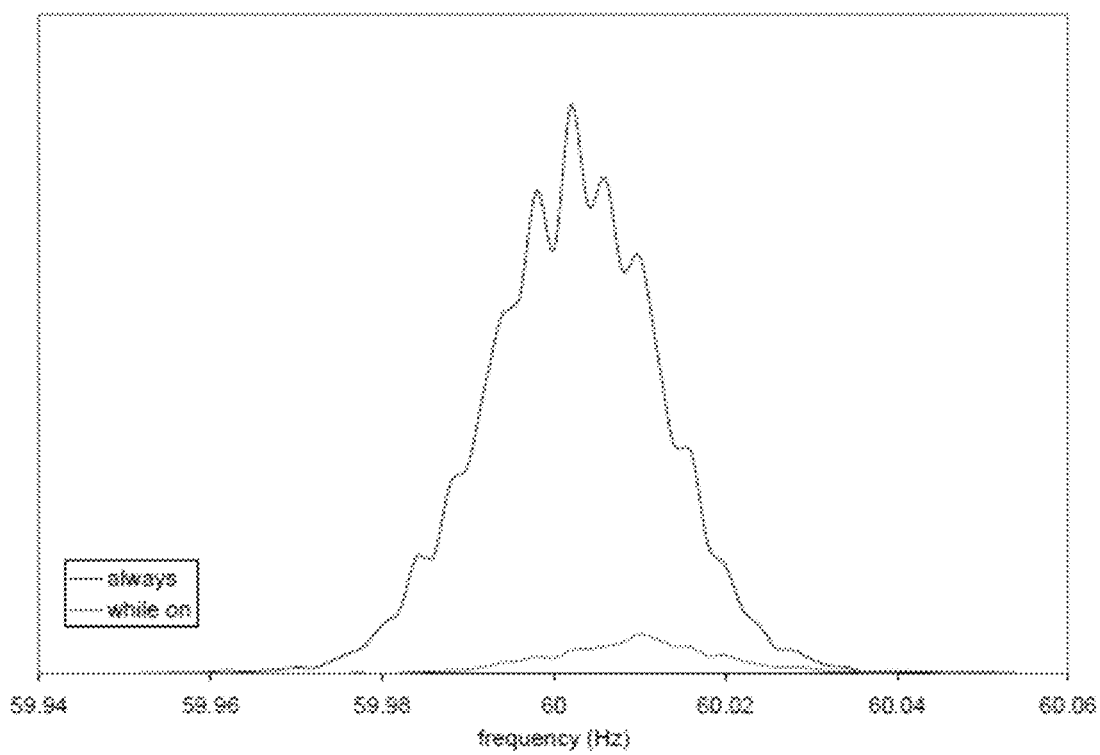
Figure 14:
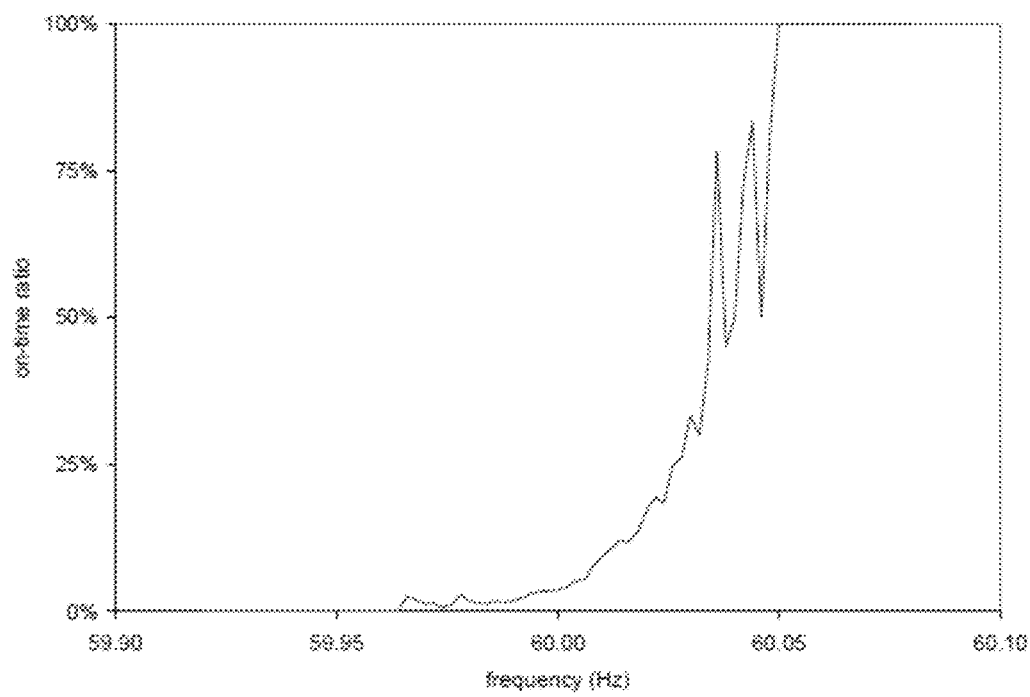

As shown in FIG. 10, the product of control lines of FIG. 9 and normalized regional grid frequency (here for Western Electricity Coordinating Council (WECC)) illustrates a bias of frequencies at which a water heater will operate at various water temperatures. FIGS. 11-12 show results data from an example controller over the length of a day using the above regulation in illustrated in FIGS. 9-10. As shown, the water heater generally responds to a decrease in temperature by operating more often and at a greater fraction of the of time. In FIG. 11, the distribution of temperatures is almost the same for examples where the water heater is controlled without using additional external regulation and where the water heater is controlled using additional external regulation based on grid frequency. Thus, in both control regimes, the temperature of the water provided by the water heater is not allowed to reach an uncomfortable level. In FIG. 12, the fraction of the time that the controller allows the water heater element to conduct is shown with respect to temperature. Thus, where the water heater temperature control is satisfied, it is less likely that the controller will direct the water heater to conduct more electricity and increase heating. For example, if the water temperature is at a generally uncomfortable level such as 30° C., the controller will use both frequency and water temperature to increase conduction, assigning less control weight to line frequency and more to temperature. FIG. 13 shows a graph of samples with respect to frequency for uncontrolled and controlled examples. As shown, the controlled scenario illustrates a control bias with system frequency, which is also evident in FIG. 14. The water heater is shown to conduct a negligibly small fraction of the time when line frequency is below about 59.97 Hz but virtually all of the energy available near and above 60.05 Hz is consumed by the water heater. In disclosed examples herein, the line frequency can be controlled to produce desired operational changes in coupled devices, such as water heaters and other appliances.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

Furthermore, in view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

I claim:

1. An apparatus, comprising:
control circuitry configured to controllably change a line frequency of a microgrid away from a nominal frequency by directing a first set of one or more electrical devices coupled to the microgrid to produce the change in the line frequency through a change in operation of the first set, such that the change in line frequency operates as a command for a second set of one or more electrical devices coupled to the microgrid to adjust operation in response to a detection of the changed line frequency changeably produced by the first set; and
second set control circuitry configured to receive line frequency detection data indicating the detected line frequency, wherein the second set control circuitry is configured to control the adjusting of operation of the second set based on the detected line frequency;
wherein the second set control circuitry is configured to control the adjusting of operation of the second set in response to the detected line frequency passing a predetermined line frequency threshold;
wherein the line frequency threshold is distributed between a pair of configurable lower and upper threshold frequency values and distributed among a plurality of the electrical devices of the second set such that the second set control circuitry is configured to change the operation of the plurality of the electrical devices of the second set proportionally to the detected line frequency between the lower and upper threshold frequency values.

2. The apparatus of claim 1, wherein the control circuitry is configured to control a line voltage of the microgrid by directing a first set of one or more electrical devices coupled to the microgrid to produce a change in the line voltage through a change in operation of the first set, such that the second set of one or more electrical devices coupled to the microgrid adjusts operation in response to a detected line voltage changeably produced by the first set.

3. The apparatus of claim 1, wherein the second set control circuitry and the control circuitry are part of a common controller configured to communicate with the first set and second set.

4. The apparatus of claim 1, wherein the second set control circuitry comprises local control circuitry arranged proximate to one or more of the electrical devices of the second set.

5. The apparatus of claim 1, wherein the second set of one or more electrical devices comprise at least a high priority set of electrical devices and a low priority set of electrical devices, wherein the adjusting of operation comprises adjusting operation of the low priority set of electrical devices in response to the detected line frequency and a line frequency trigger associated with the low priority set of electrical devices without adjusting operation of the high priority set of electrical devices.

6. The apparatus of claim 1, wherein the second set control circuitry is configured to change operation of the second set when the detected line frequency passes below the predetermined line frequency threshold.

7. The apparatus of claim 1, wherein the second set control circuitry is configured to change operation of the second set when the detected line frequency passes above the predetermined line frequency threshold.

8. The apparatus of claim 1, further comprising a detector coupled to the microgrid that detects the line frequency and sends the line frequency detection data to the second set control circuitry so that the second set control circuitry can provide the adjusting of operation of the second set.

9. The apparatus of claim 1, wherein the line frequency threshold is distributed randomly between the lower and upper threshold frequency values according to a flat probability distribution.

10. The apparatus of claim 1, wherein the line frequency threshold is distributed randomly between the lower and upper threshold frequency values according to a non-flat probability distribution.

11. The apparatus of claim 1, wherein the control circuitry and/or second set control circuitry are configured to periodically redistribute the line frequency thresholds among the plurality of the electrical devices of the second set between the pair of lower and upper threshold frequency values.

12. The apparatus of claim 1, wherein the second set control circuitry is configured to control the second set according to a duty cycle.

13. The apparatus of claim 12, wherein the duty cycle varies based on the detected line frequency.

14. The apparatus of claim 1, wherein at least one of the electrical devices of the second set includes an electricity consuming device;
wherein the second set control circuitry is configured to control an adjusting of an electricity consumption of the electricity consuming device in response to the detected line frequency.

15. The apparatus of claim 14, wherein the electricity consuming device is a water heater.

16. The apparatus of claim 1, wherein at least one of the electrical devices of the second set includes an electricity generating device;
wherein the second set control circuitry is configured to control an adjusting of an electricity generation of the electricity generating device in response to the detected line frequency.

17. The apparatus of claim 1, wherein at least one of the electrical devices of the second set includes an electricity storage device;
wherein the second set control circuitry is configured to control an adjusting of an electricity charging power from the microgrid and/or an electricity discharging power to the microgrid of the electricity storage device in response to the detected line frequency.

18. The apparatus of claim 17, wherein the electricity storage device is a battery energy storage system.

19. The apparatus of claim 1, wherein the control circuitry is configured to control the line frequency to follow a predetermined microgrid load profile.

20. The apparatus of claim 1, wherein the control circuitry is configured to control the line frequency to increase use of or to prioritize a selected electricity generation resource relative to another electricity generation source.

21. The apparatus of claim 20, wherein the selected electricity generation resource is a renewable electricity generation device.

22. The apparatus of claim 1, wherein the control circuitry is configured to estimate an electricity usage of the second set based on a history of controlled line frequency and modeled characteristics of electrical devices of the second set.

23. The apparatus of claim 22, wherein the estimated energy usage is used to estimate a present stored energy and present energy usage or generation of one or more energy storage systems of the second set.

24. The apparatus of claim 1, wherein the control circuitry is configured to control the line frequency based on electrical operational characteristics of the second set, line frequency control history that produced change in operation of the second set, and at least one criterion for controlling operation of the second set through change of line frequency.

25. The apparatus of claim 1, wherein the control circuitry is configured to change a relative sensitivity to the line frequency for one or more of the electrical devices of the second set.

26. The apparatus of claim 25, wherein the control circuitry is configured to assign different sensitivities based on one of a plurality of microgrid operational profiles, wherein the microgrid operational profiles include at least one of a normal profile, isolated profile, or critical profile.

27. The apparatus of claim 1, wherein the control circuitry is further configured to select the line frequency command based on electricity demand and/or supply price signals.

28. The apparatus of claim 27, wherein the control circuitry is further configured to select the line frequency command to prioritize usage of a renewable electricity generation device.

29. The apparatus of claim 1, wherein the control circuitry is further configured to regulate the line frequency to 50 Hz or 60 Hz by controlling operation of the first set without using the second set to change the line frequency.

30. The apparatus of claim 1, further comprising the first set, wherein the one or more electrical devices of the first set includes electricity consuming and/or electricity generating devices.

31. The apparatus of claim 1, further comprising the second set, wherein the one or more electrical devices of the second set includes electricity consuming and/or electricity generating devices.

* * * * *